(12) United States Patent
Toyoda

(10) Patent No.: US 6,198,550 B1
(45) Date of Patent: Mar. 6, 2001

(54) SCANNER SYSTEM HAVING COLOR MISREGISTRATION CORRECTION FUNCTION

(75) Inventor: Tetsuya Toyoda, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/746,222

(22) Filed: Nov. 7, 1996

(30) Foreign Application Priority Data

Nov. 17, 1995 (JP) ................................................... 7-299986

(51) Int. Cl.[7] ....................................................... H04N 1/46
(52) U.S. Cl. ............................ 358/514; 358/506; 358/518
(58) Field of Search .................................... 358/514, 513, 358/530, 518, 523, 442, 506; 395/109; 250/208.1; 382/167, 162

(56) References Cited

U.S. PATENT DOCUMENTS

| | | | |
|---|---|---|---|
| 4,812,900 | * 3/1989 | Kadowaki et al. | 358/509 |
| 5,255,083 | * 10/1993 | Capitant et al. | 358/527 |
| 5,336,878 | * 8/1994 | Boyd et al. | 250/208.1 |
| 5,608,549 | * 3/1997 | Usami | 358/530 |
| 5,699,489 | * 12/1997 | Yokomizu | 395/109 |
| 5,900,949 | * 5/1999 | Sampas | 358/482 |

\* cited by examiner

*Primary Examiner*—Cheukfan Lee
(74) *Attorney, Agent, or Firm*—Frishauf, Holtz, Goodman, Langer & Chick, P.C.

(57) ABSTRACT

A scanner system has a scanner and a personal computer (PC). On the scanner side, a fluorescent lamp for illumination is turned on, and step driving of a CCD is performed in accordance with the state of a resolution selection SW under the control of a RISC. Simultaneously, a sensing operation in the main scanning direction is performed. The sensed image signal is subjected to predetermined image processing and transferred to the PC side. Upon completion of scanning of one frame of a film, information (scanning parameters) associated with the resolution and sub-scanning direction is transferred to the PC side. The fluorescent lamp is turned off, and processing on the scanner side is ended. On the PC side for performing information processing, the correction amount for color misregistration of the sensed image signal is determined on the basis of the scanning parameters with reference to a table held in advance, in which optimum correction processing is defined, under the control of a CPU. The images of the respective color components are shifted in the sub-scanning direction on the basis of the correction amount, thereby performing color misregistration correction. The result is subjected to predetermined conversion and externally sent.

12 Claims, 11 Drawing Sheets

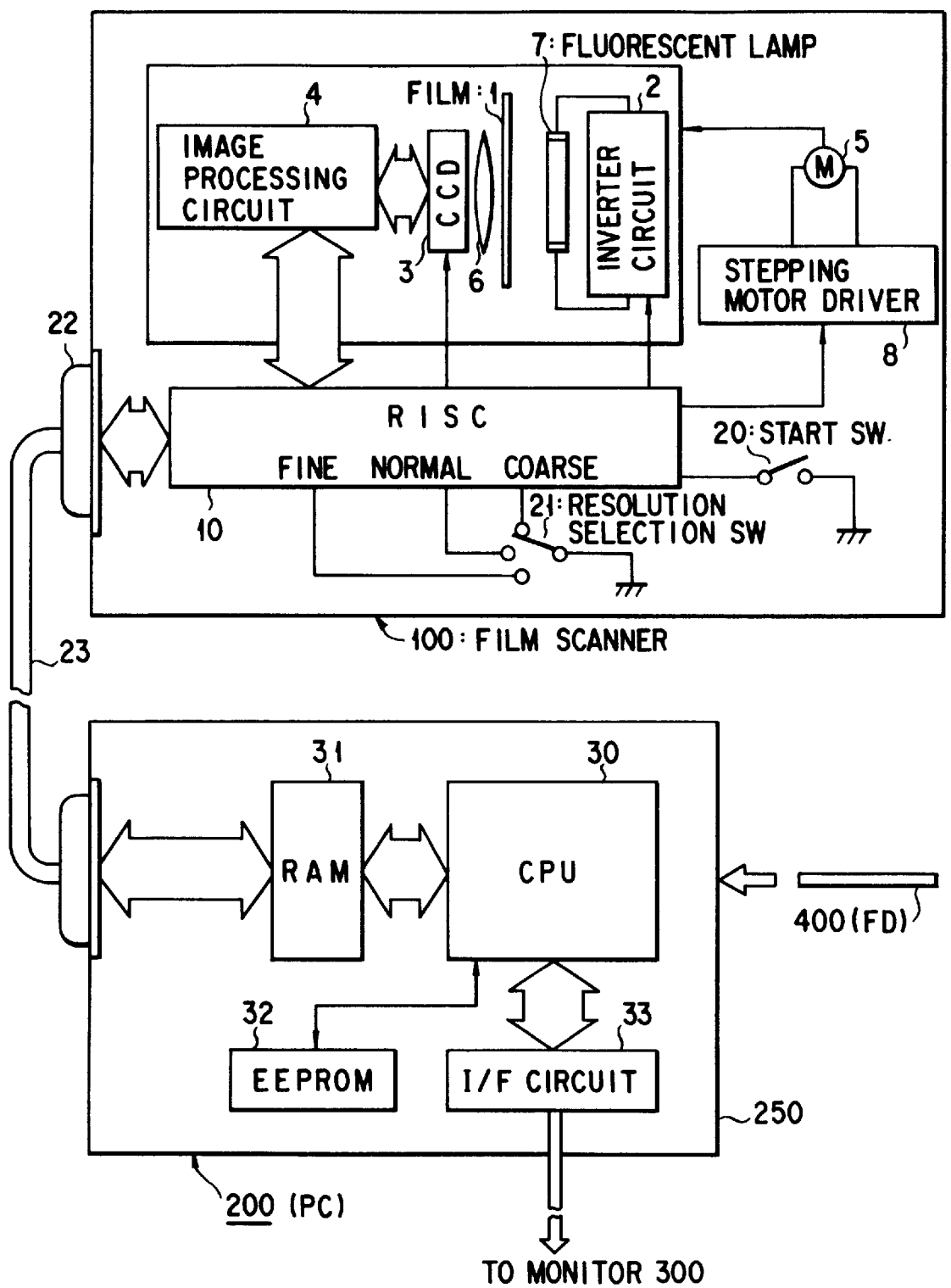
F I G. 2

| READ "RESOLUTION" | SENSING COLOR | SENSING AREA | | |
|---|---|---|---|---|
| FINE (SENSOR WIDTH × 1) | GREEN | 1 | 2 | 3 |
| | RED BLUE | 3 | 4 | 5 |
| NORMAL (SENSOR WIDTH × 2) | GREEN | 1~2 | 3~4 | 5~6 |
| | RED BLUE | 3~4 | 5~6 | 7~8 |
| COARSE (SENSOR WIDTH × 5) | GREEN | 1~5 | 6~10 | 11~15 |
| | RED BLUE | 3~7 | 8~12 | 13~17 |

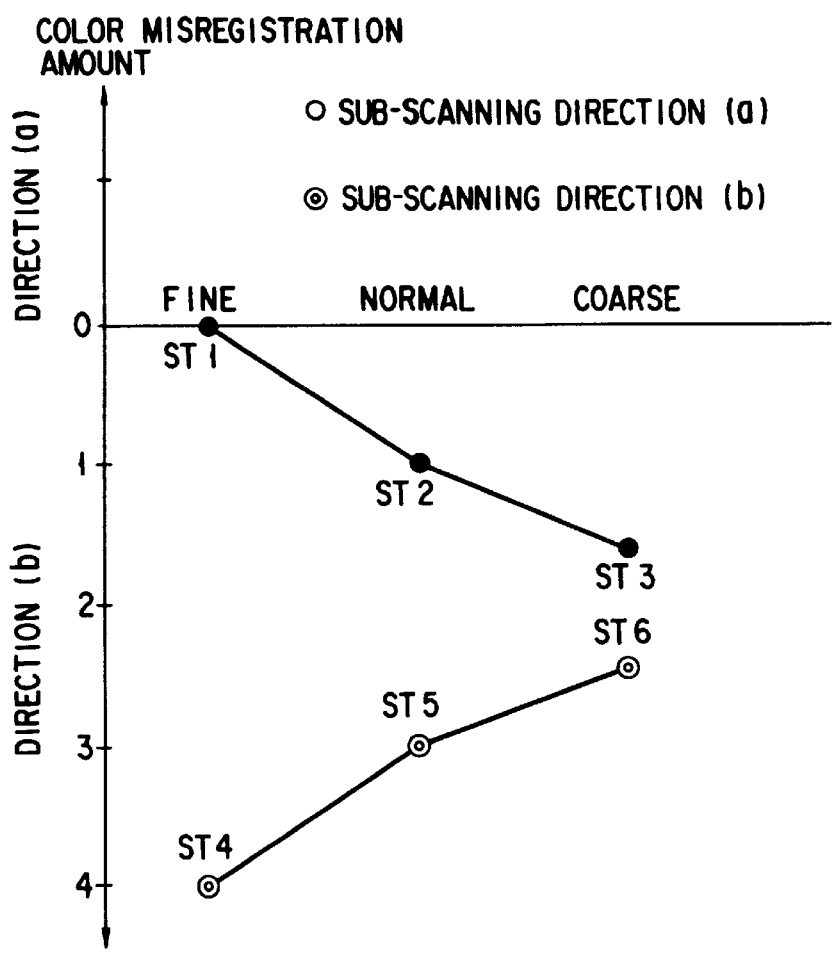
F I G. 6
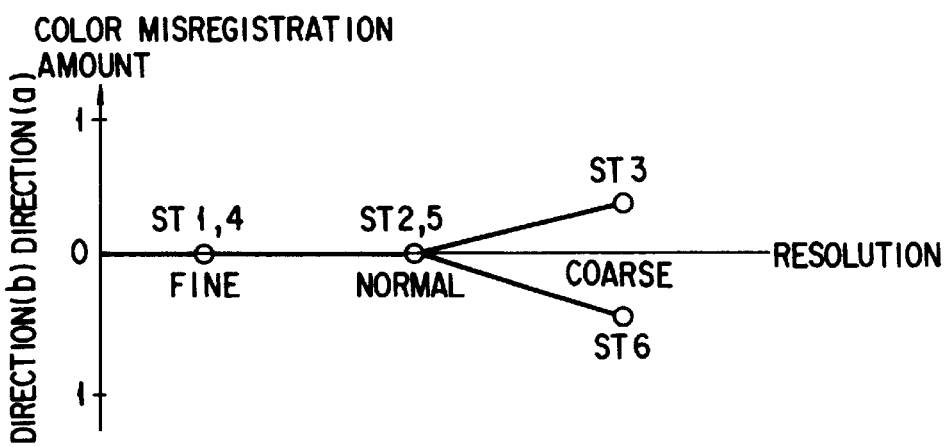
F I G. 7

| STATE | CORRECTION PROCESSING | Ns |
|---|---|---|
| ST1 | NO CORRECTION | 0 |
| ST2 | SHIFT 1 PIXEL IN DIRECTION (a) | 1 |
| ST3·ST6 | SHIFT 2 PIXELS IN DIRECTION (a) | 2 |
| ST5 | SHIFT 3 PIXELS IN DIRECTION (a) | 3 |
| ST4 | SHIFT 4 PIXELS IN DIRECTION (a) | 4 |

F I G. 12

| STATE | CORRECTION PROCESSING | Ns |
|---|---|---|
| ST7 | SHIFT -2 PIXELS IN DIRECTION (a) | -2 |
| ST8 | SHIFT -1 PIXEL IN DIRECTION (a) | -1 |
| ST9·ST12 | NO CORRECTION | 0 |
| ST11 | SHIFT 1 PIXEL IN DIRECTION (a) | 1 |
| ST10 | SHIFT 2 PIXELS IN DIRECTION (a) | 2 |

F I G. 13

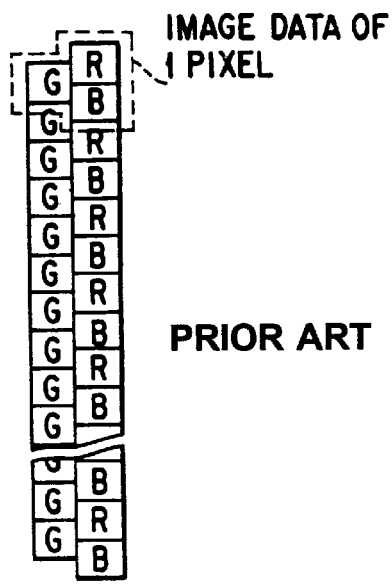
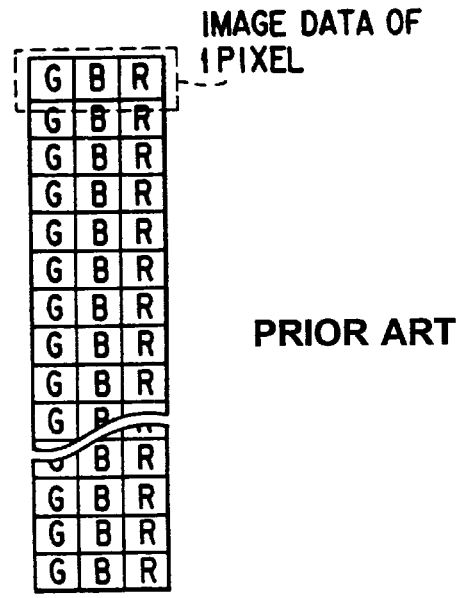
FIG. 14A  FIG. 14B
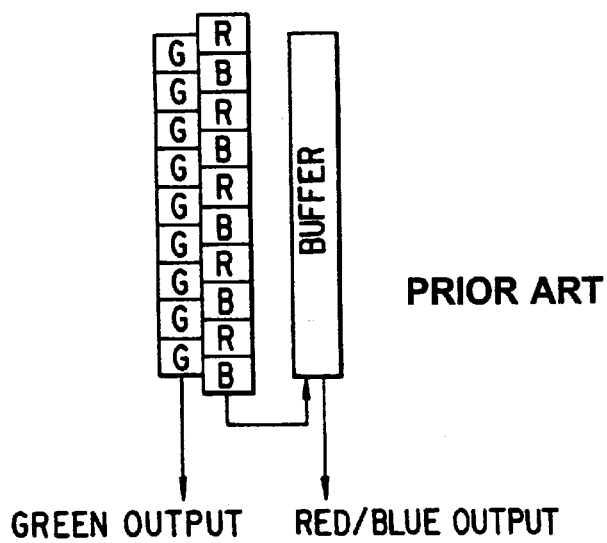
FIG. 14C

SCANNER SYSTEM HAVING COLOR MISREGISTRATION CORRECTION FUNCTION

BACKGROUND OF THE INVENTION

1. Field of the Invention

The present invention relates to a scanner system and, more particularly, to a scanner system having a function of, using a computer, correcting any color misregistration generated in reading a color image by a scanner.

2. Description of the Related Art

Generally, a linear sensor is used as the image sensing device of a scanner for reading a color image.

In this case, two systems are available to convert the read image into a color image, e.g., to separate the image into three primary colors (R, G, and B), i.e., red, green, and blue components: a system which separates the light source into three primary colors and scans the image three times ("three-pass system") and a system which scans the original only once using a color CCD linear sensor which has a plurality of arrays of charge-coupled devices (CCDs) with three primary color filters formed thereon ("one-pass system").

In the RGB system, as the linear sensor used for the latter one-pass system, a "two-line linear sensor" having a total of two arrays of CCDs, i.e., an array of green CCDs and an array of red/blue CCDs, or a "three-line linear sensor" having three arrays of CCDs for red, green, and blue can be used.

FIGS. 14A to 14C are schematic views showing conventional linear sensors.

FIGS. 14A and 14B respectively show a two-line linear sensor and a three-line linear sensor.

R, G, and B in these drawings represent pixels of red, green, and blue CCDs, respectively, which are aligned in the main scanning direction (longitudinal direction) of the sensor.

The three-line linear sensor shown in FIG. 14B prepares data of one pixel of an image on the basis of outputs from the G, B, and R pixels aligned in the horizontal direction.

The two-line linear sensor shown in FIG. 14A prepares data of one pixel of an image on the basis of outputs from the G, B, and R pixels adjacent to each other. However, since the number of B or R pixels is ½ that of G pixels, B and R data are used twice to prepare image data.

When an original is sensed by a so-called "one-pass system" using a sensor having a plurality of lines in the main scanning direction, a color misregistration inevitably occurs because of its principle.

This is because the R, G, and B values constituting one pixel of the sensed image are obtained by sensing the original at positions slightly shifted from each other.

To cope with this problem, the conventional scanner temporarily stores a sensed image signal and reads the signal from a buffer incorporated in the scanner main body at a timing at which such color misregistration may not occur.

In some cases, the buffer is incorporated not in the scanner main body but in the linear sensor, and such a buffer incorporated type linear sensor as shown in FIG. 14C is used. With this arrangement, the entire scanner apparatus can be easily controlled.

As described above, the conventional scanner uses a buffer incorporated type linear sensor as shown in FIG. 14C to temporarily store a sensed image signal in the buffer and reads out the signal from the buffer at a predetermined timing, thereby preventing a color misregistration.

Such a buffer is sometimes separately arranged in the scanner main body, instead of in the linear sensor.

However, when the buffer is arranged in the scanner main body, the scanner becomes bulky, and the apparatus becomes expensive accordingly.

In case of the buffer incorporated type linear sensor as well, a sub-scanning direction in which color misregistration correction can be performed is limited to only one direction. When a sub-scanning operation is performed in the opposite direction, the color misregistration undesirably increases. Therefore, a bidirectional sub-scanning operation cannot be performed though it is convenient in practice.

When an original is to be read with various resolutions, the degree of color misregistration changes depending on the read resolution. When a buffer is used to shift the timing of outputting the image signal, the color misregistration undesirably increases.

SUMMARY OF THE INVENTION

The present invention has been made in consideration of the above disadvantages, and has as its object to provide a scanner system capable of performing color misregistration correction processing regardless of the sub-scanning direction or read resolution.

According to an aspect of the present invention, there is provided a scanner system comprising a scanner for sensing a color original image by a linear sensor constituted by a plurality of solid state image sensing device arrays, and an information processing unit for processing an image signal output from the scanner, wherein the information processing unit has correction means for correcting a color misregistration between image signals output from the plurality of solid state image sensing device arrays.

According to another aspect of the present invention, there is provided a scanner system for reading a color original image, comprising a scanner having a linear sensor constituted by a plurality of solid state image sensing device arrays to sense the color original image and output an image signal, and control means for outputting a control signal for defining a predetermined condition of a sensing operation by the linear sensor, and an information processing unit having color misregistration correction means for correcting, on the basis of the control signal output from the control means, a color misregistration between image signals sensed by the plurality of solid state image sensing device arrays.

The scanner has resolution selection means for selectively switching a read resolution, and the control signal output from the control means comprises at least one of a signal containing information of a sub-scanning direction of the linear sensor and a signal representing a resolution set by the resolution selection means.

More specifically, in the above-described scanner system, the plurality of solid state image sensing device arrays constituting the linear sensor of the scanner transfer read image information including a color misregistration generated because of their structures to the information processing unit connected for color misregistration correction of the image information.

This information processing unit performs predetermined correction processing for the color misregistration between the image signals output from the plurality of solid state image sensing device arrays constituting the linear sensor under the control of the color misregistration correction means of the control means in consideration of the predetermined sensing condition of the linear sensor (e.g., the resolution selected by the resolution selection means or the size of image sensing device arrays).

With this processing, the color misregistration amount contained in the read image information converges to zero to be removed or is reduced to a minimum.

According to still another aspect of the present invention, there is provided a method of correcting a color misregistration in an image signal in a computer system which executes processing of the image signal from a scanner including a linear sensor for reading an original in accordance with a predetermined sub-scanning parameter, comprising the steps of:

receiving the image signal from the scanner and the predetermined sub-scanning parameter and storing the image signal and the sub-scanning parameter in a memory;

determining a displacement amount for correcting the color misregistration in the image signal in accordance with the predetermined sub-scanning parameter read out from the memory; and performing predetermined image arithmetic processing for the image signal read out from the memory in accordance with the determined displacement amount, thereby correcting the color misregistration.

According to still another aspect of the present invention, there is provided an article of manufacture comprising:

a computer readable memory medium having computer readable program coding means recorded to execute processing of an image signal from a scanner including a linear sensor for reading an original in accordance with a predetermined sub-scanning parameter, wherein the computer readable program coding means comprises first computer readable program means for causing a computer to receive the image signal from the scanner and the predetermined sub-scanning parameter and store the image signal and the sub-scanning parameter in a memory, second computer readable program means for causing the computer to determine a displacement amount for correcting a color misregistration in the image signal in accordance with the predetermined sub-scanning parameter read out from the memory; and third computer readable program means for causing the computer to perform predetermined image arithmetic processing for the image signal read out from the memory in accordance with the determined displacement amount, thereby correcting the color misregistration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the arrangement of a film scanner system comprising a film scanner and an information processing unit according to the embodiment of the present invention;

FIG. 6 is a graph for explaining differences in amounts of color misregistration generated in the read image depending on the sub-scanning direction or resolution before color misregistration correction processing in the scanner system of the first embodiment;

FIG. 7 is a graph for explaining improved differences in color misregistration amounts generated depending on the sub-scanning direction or resolution after color misregistration correction processing in the scanner system of the first embodiment;

FIG. 12 is a table showing color misregistration states (ST) and corresponding displacement amounts (Ns) for correction processing of the first embodiment;

FIG. 13 is a table showing color misregistration states (ST) and corresponding displacement amounts (Ns) for correction processing of the second embodiment; and FIGS. 14A to 14C are views showing the structures of conventional linear sensors, i.e., a two-line linear sensor, a three-line linear sensor, and a two-line linear sensor incorporating a buffer, respectively.

DETAILED DESCRIPTION OF THE PREFERRED EMBODIMENTS

Figure 1:
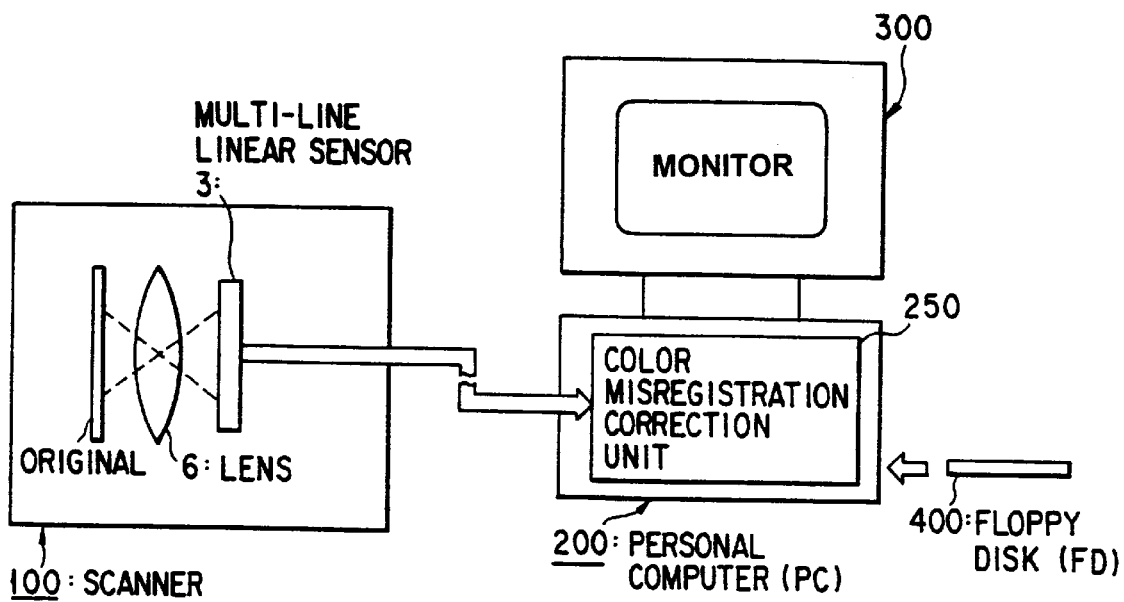
FIG. 1 is a view showing the arrangement of a scanner system according to the embodiment of the present invention.

Reference will now be made in detail to the presently preferred embodiments of the invention as illustrated in the accompanying drawings, in which like reference characters designate like or corresponding parts throughout the several drawings.

Scanner systems according to a plurality of embodiments of the present invention will be described below with reference to the accompanying drawings.

(First Embodiment)

A scanner system according to the first embodiment of the present invention will be described below.

FIG. 1 is a view showing a scanner system to which the first embodiment of the present invention is applied.

As shown in FIG. 1, this scanner system is mainly constituted by a scanner 100 for scanning an original, and a personal computer (to be referred to as a PC hereinafter) 200 having a color misregistration correction unit for correcting color misregistrations generated in scanned images.

The scanner 100 has an optical system including a lens 6 and a linear sensor (multi-line linear sensor) 3 with a plurality of device arrays to sense a set original.

The PC 200 has a color misregistration correction unit 250 connected to the scanner 100 through a connection line and having a function of correcting a color misregistration contained in an image signal.

In the scanner 100, an original image is scanned by the multi-line linear sensor 3 through the lens 6 and photoelectrically converted into an image signal.

The image signal obtained by the scanner 100 is transferred to the PC 200 through the connection line and subjected to correction processing by the color misregistration correction unit 250 of the PC 200, which has a function of correcting any color misregistration generated in the image signal upon reading/conversion by the scanner 100.

In this case, a memory medium 400 such as a floppy disk (to be referred to as an FD hereinafter) loaded in the PC 200 stores a series of computer readable programs including predetermined procedures necessary for correction processing by the color misregistration correction unit 250.

The result obtained upon color misregistration correction processing by the PC 200 is displayed on a monitor 300 connected to the PC 200 and also output to an external unit such as a printer (not shown).

FIG. 2 is a block diagram of a film scanner system according to the first embodiment of the present invention.

In this film scanner system, the film scanner 100 for reading an image formed on a developed color film 1 as an original is connected to the PC 200 having the color misregistration correction unit 250 through a connector 22 and a connection cord 23 to allow mutual communication.

The FD 400 serving as a memory medium loaded in the PC 200 stores a series of computer readable program coding means including predetermined procedures necessary for correction processing by the color misregistration correction unit 250, as will be described later.

The film scanner 100 of this embodiment has the CCD 3 serving as a linear sensor for sensing an image of the film 1 as an original. The CCD 3 as a linear sensor is driven by a motor so that a desired image of the film 1 can be scanned.

More specifically, the film scanner 100 has a fluorescent lamp 7 for illuminating the film 1, an inverter circuit 2 for turning on the fluorescent lamp 7 and controlling the light amount, a two-line linear sensor (to be simply referred to as the CCD 3 serving as a linear sensor hereinafter) for converting an image of the film 1 illuminated with the fluorescent lamp 7 into an electrical signal, the lens 6 for guiding the image of the film 1 to the CCD 3, an image processing circuit 4 for processing the electrical signal from the CCD 3 and having a clamp circuit, an amplifier, a gamma converter, a gamma (˜) conversion type A/D converter (ADC) for performing A/D conversion, and the like, and a motor 5 driven by a stepping motor driver 8 for step-driving the CCD 3 serving as an image sensing means.

The film scanner 100 also has a Reduced Instruction Set Computer (RISC) 10 connected to the respective portions to integrally control these portions.

The film 1 loaded in the film scanner 100 is fed, and a desired frame is positioned on the optical axis. The lens 6, the fluorescent lamp 7, and the CCD 3 integrally move from one end to the other end of the image, thereby performing a sub-scanning operation.

When the image of the next frame of the film 1 is to be continuously read, the fluorescent lamp 7, the CCD 3 serving as a linear sensor, and the like move in a direction opposite to the previous direction, thereby performing another sub-scanning direction.

As described above, according to the present invention, a bidirectional sub-scanning operation is performed. Therefore, the scanning time can be shortened as compared to the conventional sub-scanning operation in one direction, in which the next scanning operation must be performed after returning the linear sensor to a reference position (e.g., one end side of the image of the film 1).

The CCD 3 serving as a linear sensor is of a buffer incorporated type, as shown in FIG. 14C. By controlling read pulses, red and blue signals which have simultaneously been sensed can be delayed with respect to a green signal and output.

With this arrangement, when a scanning operation is performed in a predetermined direction at a resolution with which the linear sensor is moved by a distance corresponding to its width in one sub-scanning cycle (this resolution substantially means the highest resolution), no color misregistration is generated.

A start switch (SW) 20 for starting original read processing, and a resolution selection switch (SW) 21 for selecting a desired "resolution" from a plurality of resolutions in original read processing are connected to the RISC 10 shown in FIG. 2.

The resolution selection SW 21 is a toll switch serving as a switching means for selecting the read "resolution" from, e.g., three modes such as "fine", "normal", and "coarse".

The connector 22 for data communication between the film scanner 100 and the PC 200 is connected without interposing an IC dedicated for communication.

Data communication between the film scanner 100 and the PC 200 can be performed by a predetermined communication software program held in the RISC 10.

If the above-described control operation is to be executed by a single controller using software, processing at a higher speed is required because various processing sequences including the read sequence of the CCD 3, the control sequence of the image processing circuit 4, the driving sequence of the stepping motor 5, and the data communication sequence with the connected PC 200 themselves require a considerably high speed, and the plurality of sequences must be performed parallelly.

For this reason, it is difficult to execute the control operation using, as a control microcomputer for executing these sequences, a CPU such as a conventional CISC (Complexed Instruction Set Computer) in software, as is apparent.

In this embodiment, a so-called "single controller" can be realized by the CPU on the film scanner main body side by using the RISC (Reduced Instruction Set Computer) 10.

As a result, one instruction can be executed by the RISC 10 in a time of one clock, though a time corresponding to four clocks is required for a CISC. This means essentially processing at a speed four times that of a CISC can be achieved.

Where a CISC can perform signal processing of 30 steps within the latency of each signal control processing, a RISC having the performance of the RISC 10 allows signal arithmetic processing of 120 steps. Signal arithmetic processing or control processing more advanced and complex than the prior art is enabled, and at the same time, the S/N ratio can be increased.

In addition, control of a larger number of complex sequences can be executed by a software program.

In the PC 200 shown in FIG. 2, a random access memory (RAM) 31 for temporarily storing an image signal, a non-volatile memory (EEPROM) 32 in which data associated with correction processing is stored in advance in a table format at the time of manufacture, as shown in FIG. 12, and an interface (I/F) circuit 33 for outputting a processed image to the external monitor 300 (not shown) are connected to a central processing unit (CPU) 30 so as to be controlled by the CPU 30.

The CPU 30 also has a processing function as the color misregistration correction unit 250 to read out an image signal from the RAM 31 without generating any color misregistration on the basis of a predetermined computer readable program coding means (to be described later) stored in the FD 400 serving as a memory medium loaded in the PC 200.

Figure 3:
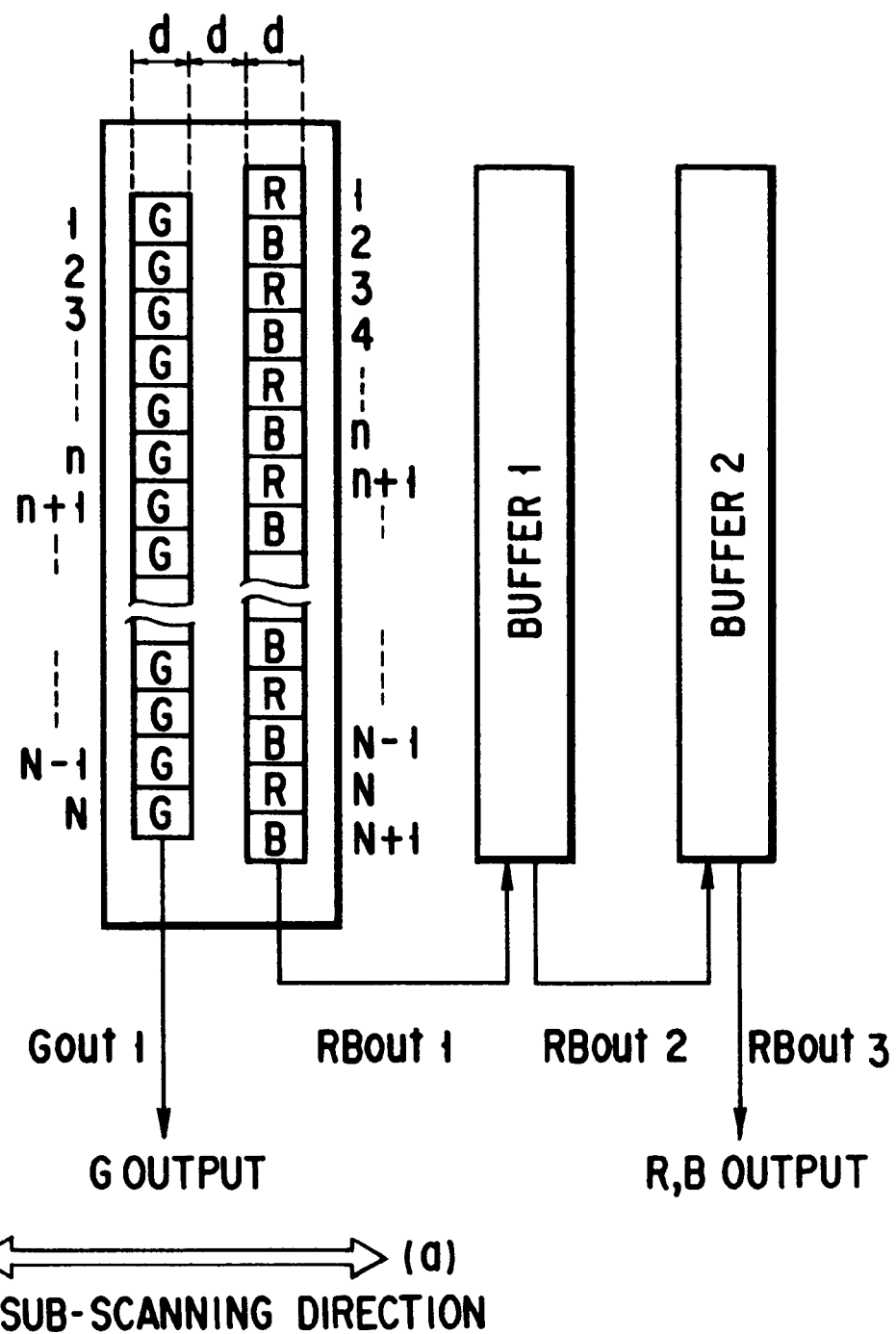
FIG. 3 is a view for explaining the structure and operation of CCDs serving as a linear sensor of the embodiment of the present invention.

FIG. 3 is a view showing the structure of the CCD 3 serving as a linear sensor.

As shown in FIG. 3, the CCD 3 serving as a linear sensor has a structure in which a green linear sensor having N green (G) CCDs and an opening width d, and a red/blue linear sensor having N+1 red (R) and blue CCDs which are alternately arranged, and an opening width d, are parallelly separated from each other by the distance d.

Two buffers 1 and 2 for correcting any color misregistration in the output from the red/blue linear sensor are arranged in series.

When a sensing operation is started, and a first read pulse PL1 is transmitted to the CCD 3 serving as a linear sensor, an image signal (Gout 1) is output from the green linear sensor to the RISC 10.

On the other hand, an image signal (RBout 1) from the red/blue linear sensor is sent not to the RISC 10 but to buffer 1.

When a second read pulse PL2 is transmitted, the signal accumulated in buffer 1 is transferred to buffer 2 (RBout 2).

When a third read pulse PL3 is transmitted, the image signal accumulated in buffer 2 is output to the RISC 10 for the first time (RBout 3).

In this manner, the image signal from the red/blue linear sensor is output to the RISC 10 at a timing delayed by two pulses.

Therefore, when the CCD 3 serving as a linear sensor is moved in the sub-scanning direction (a) by a distance 2d between transmission of the first read pulse PL1 and transmission of the third read pulse PL3, an image signal without any color misregistration can be obtained in theory.

The relationship between the original sensing area and read resolution of the CCD 3 serving as a linear sensor will be described below with reference to FIG. 4.

Figures 4, 5:
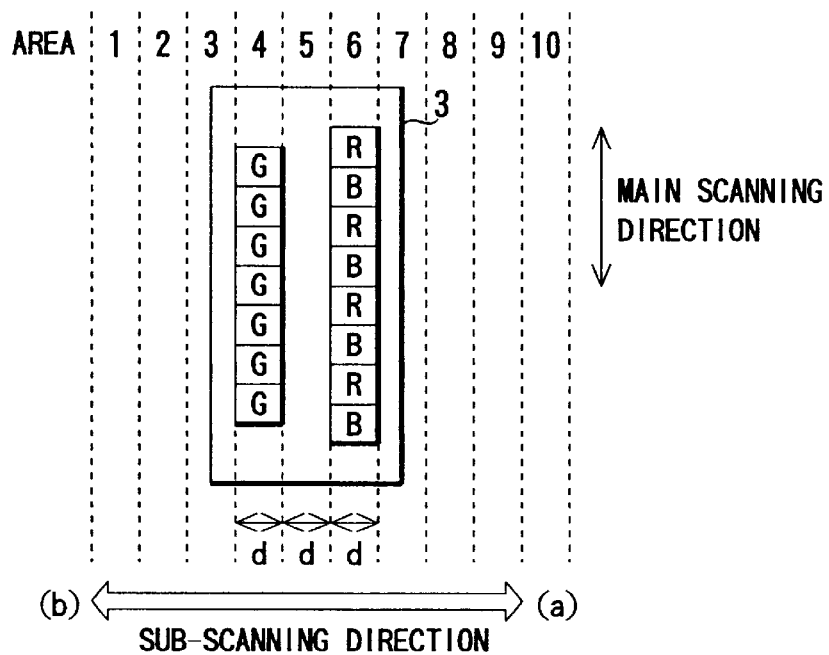
FIG. 4 is an explanatory view showing the pixel arrangement and scanning directions and areas of the linear sensor.
FIG. 5 is a table showing the relationship between the read resolution of the linear sensor and the sensing area and sensing color of an original, in the embodiment of the present invention.

As shown in FIG. 4, an original is divided by the width of the CCD 3 serving as a linear sensor, and the resultant areas are represented as area 1, area 2, area 3, . . . .

The CCD 3 serving as a linear sensor moves in these areas in the sub-scanning directions indicated by arrows, i.e., in horizontal directions (a) and (b), thereby sensing an image in the film 1 as an original.

Of these sub-scanning directions, the right direction is indicated by the direction (a), and the left direction is indicated by the direction (b).

In this case, the pitch of the sub-scanning operation changes depending on the read "resolution". The scanning operation is performed at a predetermined pitch corresponding to the resolution selected by the resolution selection SW 21.

More specifically, when the selected resolution is "fine", the sub-scanning moving amount per integration time of the CCD 3 serving as a linear sensor corresponds to the opening width d of the CCD of the CCD 3 serving as a linear sensor.

This resolution corresponds to a fine mode.

When the selected resolution is "normal", the moving amount is set to be, e.g., twice the opening width d.

When the selected resolution is "coarse", the moving amount is set to be, e.g., five times the opening width d.

FIG. 5 is a table showing the read "resolutions" and sensing areas for green and red/blue to be simultaneously sensed under the above conditions.

As can be seen from FIG. 5, when "normal" is selected as "resolution", and the green linear sensor is sensing areas 1 and 2, the red/blue linear sensor is sensing areas 3 and 4.

On the basis of FIG. 5, differences in "color misregistration amount" depending on the sub-scanning direction or resolution are shown in the graph of FIG. 6.

The graph shown in FIG. 6 indicates the tendency of changes in amount of color misregistration generated in a read image when color misregistration correction processing is not performed.

The ordinate of the graph in FIG. 6 indicates the direction and amount of color misregistration in a red/blue area when a green area is set at a reference position.

The "color misregistration amount" is represented in units of pixels of the sensed image.

Assume that the sub-scanning direction is the direction (a), "normal" is selected as a resolution, the green linear sensor senses areas 1 and 2, and the red/blue sensor simultaneously senses areas 3 and 4. In this case, the "color misregistration amount" is 1.0.

The abscissa of the graph in FIG. 6 indicates the read "resolution" selected by the resolution selection SW 21.

As is apparent from FIG. 6, the "color misregistration amount" largely changes depending on the read resolution and sub-scanning direction.

The scanner system of the present invention calculates the "amount of color misregistration" that may be generated in a read image by using the read resolution and sub-scanning direction as parameters, and performs color misregistration correction processing on the basis of the calculation result, thereby always obtaining an image with a minimum color misregistration.

More specifically, predetermined correction processing set as contents shown in the table of FIG. 12 is performed for each of six states (i.e., ST1 to ST6 in FIG. 6) each of which is uniquely determined on the basis of the above parameters, thereby correcting color misregistrations.

The method of correction processing will be described below in more detail.

Image data before color misregistration correction processing, which is set in the RAM 31 shown in FIG. 2, is represented as $Ci\{R(i,j), G(i,j), B(i,j)\}$. Image data after color misregistration correction processing is represented as $Co\{R(i,j), G(i,j), B(i,j)\}$.

Note that i and j represent the coordinate values of the image sensed by the CCD 3 along the sub-scanning and main scanning directions, respectively.

Using Ci and Co, correction processing set in the table shown in FIG. 5 can be expressed as follows:

$$Co\{R(i,j), G(i,j), B(i,j)\}=Ci\{R(i+Ns,j), G(i,j), B(i+Ns,j)\} \quad (1)$$

where Ns is the displacement amount corresponding to Ns pixels to be shifted in the direction (a).

When control is performed in correspondence with the value Ns of the displacement amount (i.e., the correction amount) of pixels to be shifted such that equation (1) is satisfied, correction processing optimum for a color misregistration state ST can be performed.

As a result of correction processing, the "color misregistration amounts" of the states ST1 to ST6 in FIG. 6 before correction are reduced as shown in the graph of FIG. 7. For example, when the resolution is "fine" or "normal", the color misregistration amount becomes zero. In case of "coarse" as well, the color misregistration amount largely decreases.

The table relating the states ST and the corresponding displacement amounts Ns, shown in FIG. 12, is stored in the EEPROM 32 in advance. This table is sequentially looked up by the CPU 30 in correction processing and used for color misregistration correction.

Figure 9:
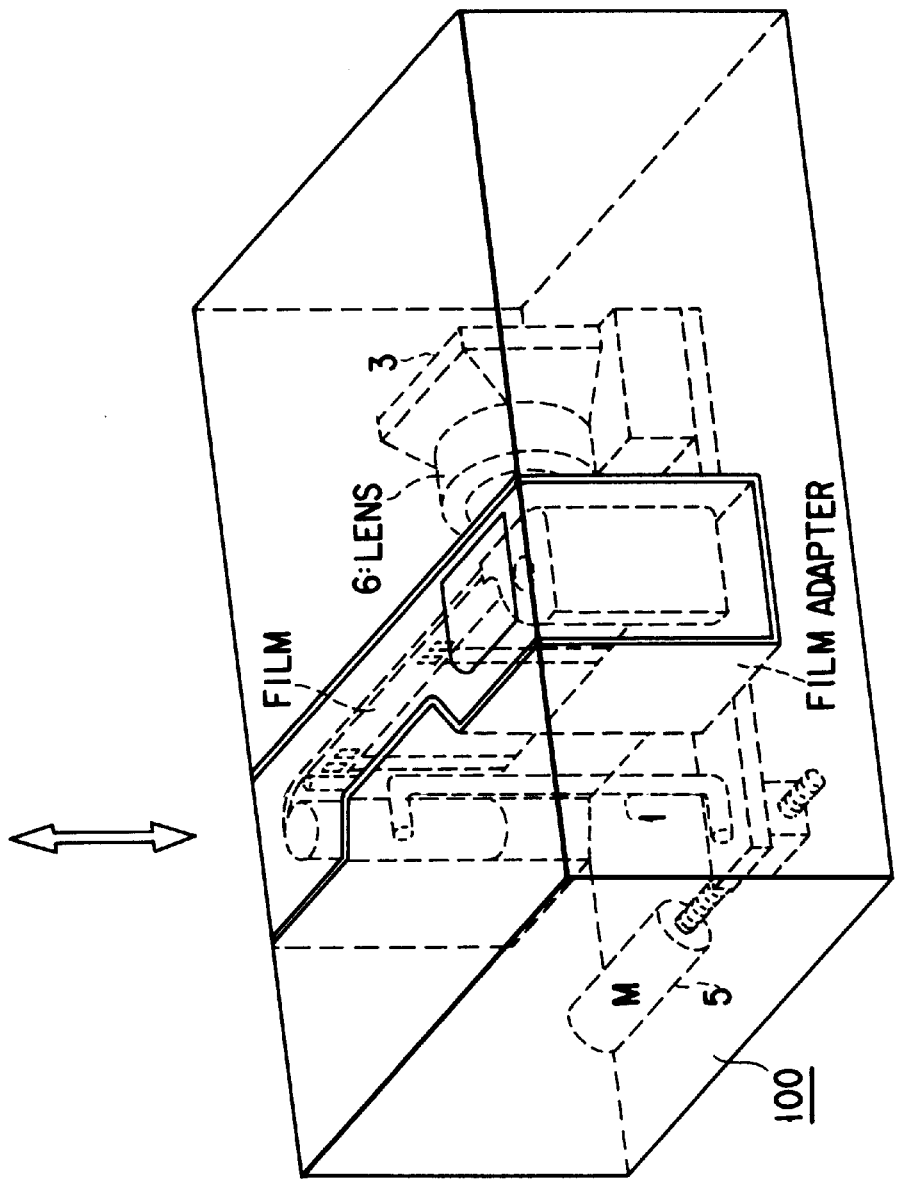
FIG. 9 is a perspective view showing a scanner apparatus in which a film adapter as an example of the film scanner of the embodiment of the present invention can be mounted.

FIG. 9 is a perspective view showing an example of the film scanner of the present invention, i.e., a scanner apparatus in which a film adapter can be mounted.

The film scanner shown in FIG. 9 can detachably incorporate a film adapter capable of loading a cartridge film or a normal roll film as a scanning target.

More specifically, when a detachable cartridge film is inserted in the vertical direction indicated by an arrow in FIG. 9, the film surface is positioned on the optical axis. A desired frame is automatically searched for in accordance with an operation instruction, and the scanning operation is performed, thereby generating an image signal.

Not only a PC dedicated to image processing but also any other PC can be used as a PC (not shown) basically as long as it can execute the correction processing operation of the present invention.

As shown in this example, the scanner and information processing unit constituting the film scanner system of the present invention can take various forms.

The operation of the scanner system will be described below with reference to the flow charts shown in FIGS. 8A and 8B.

Figure 8A:
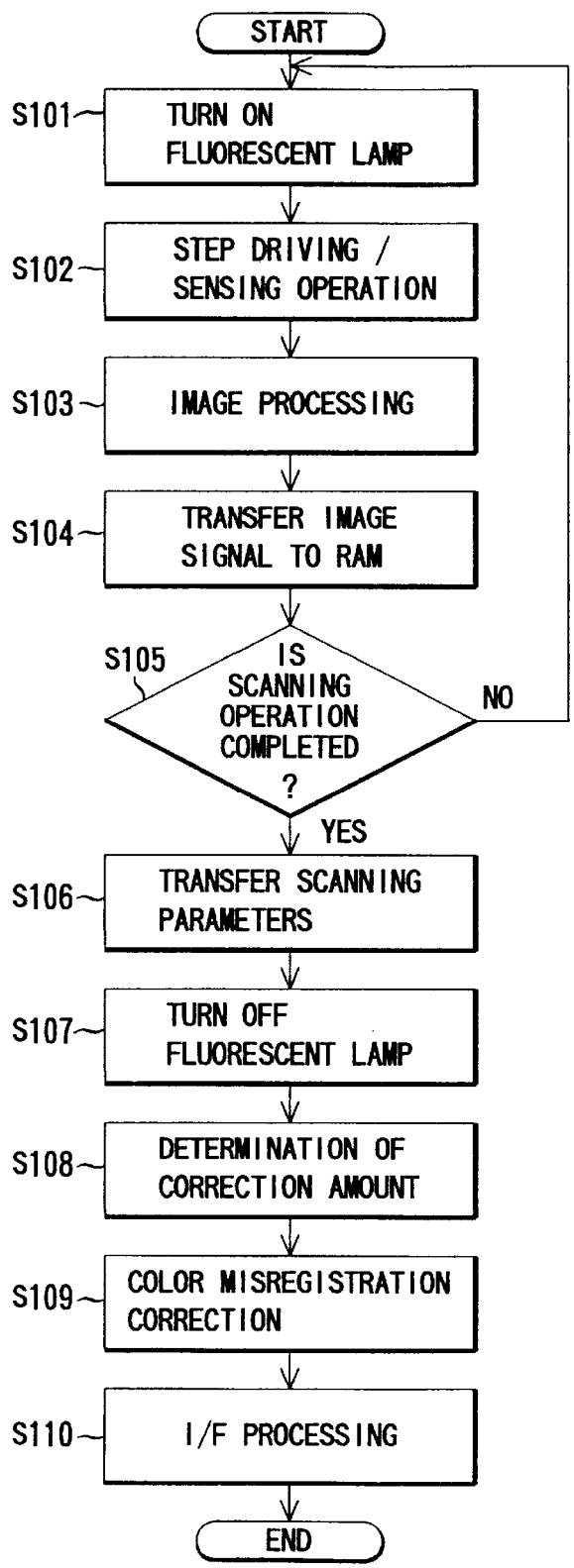
FIGS. 8A and 8B are flow charts showing the operation procedures of the scanner system of the embodiment of the present invention.

A series of sequences shown in FIG. 8A start upon turning on the start SW 20 on the film scanner 100 side.

The inverter circuit 2 is controlled in accordance with an instruction from the RISC 10, so that the fluorescent lamp 7 for film illumination is turned on (step S101).

The state of the resolution selection SW 21 is determined by the RISC 10. On the basis of the determination result, the CCD 3 is step-driven under the control of the stepping motor driver 8, and simultaneously, a sensing operation in the main scanning direction is performed (step S102).

Next, an image signal sensed by the CCD 3 is clamped, amplified, gamma-converted, and A/D-converted by the image processing circuit 4, and transferred to the RISC 10 (step S103).

The image signal transferred to the RISC 10 is sent to the PC 200 through the connector 22 and the connection line 23 and stored in the RAM 31 in the PC 200 (step S104).

The above series of processing are repeated during the scanning operation of the target image (if NO in step S105).

When one frame of the film image is completely scanned (if YES in step S105), information associated with the read "resolution" and sub-scanning direction (i.e., parameters) is transferred from the RISC 10 to the RAM 31 on the PC 200 side through the cable 23 (step S106).

The fluorescent lamp is turned off (step S107), and processing on the film scanner 100 side is ended.

The subsequent processing in steps S108 to S110 are performed on the PC side.

The scanning parameters set in the RAM 31 are read out by the CPU 30.

The CPU 30 determines the correction amount for color misregistration correction with reference to the table stored in the EEPROM 32, in which correction processing is defined, on the basis of the scanning parameters read out from the RAM 31 (step S108).

In addition, the CPU 30 shifts the image of the green component and the image signal of the red and blue components in the sub-scanning direction on the basis of the determined correction amount in accordance with equation (1) and reads out the image data from the RAM 31, thereby performing color misregistration correction processing (step S109).

The image data after color misregistration correction processing is sent to the I/F circuit 33, converted into a signal form corresponding to an external monitor (not shown), and sent to the external monitor (step S110).

The sequence is ended.

Figure 8B:
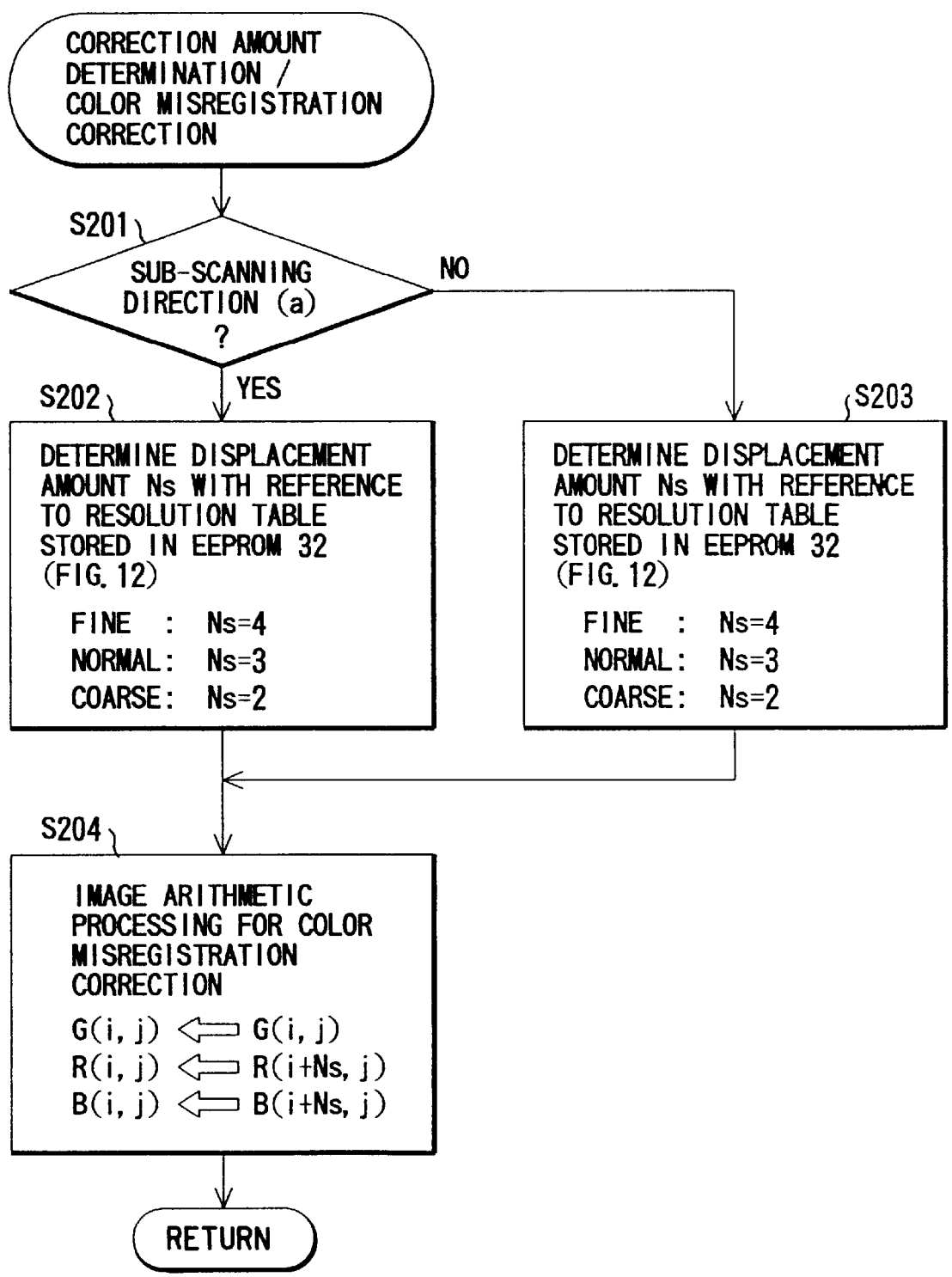

FIG. 8B is a flow chart for explaining step S108 for determining the correction amount for color misregistration correction and step S109 for performing color misregistration correction processing in FIG. 8A in more detail.

Steps S201 to S203 in FIG. 8B correspond to step S108 for determining the correction amount for color misregistration correction in FIG. 8A.

Step S204 in FIG. 8B corresponds to step S109 for performing color misregistration correction in FIG. 8A.

In step S201 in FIG. 8B, the CPU 30 determines whether the sub-scanning direction as a scanning parameter read out from the RAM 31 is the direction (a).

If YES in step S201, the CPU 30 branches to processing in step S202.

In step S202, the CPU 30 determines the displacement amount Ns on the basis of the selection information of three "resolutions", i.e., "fine", "normal", and "coarse", as a scanning parameter read out from the RAM 31 with reference to data associated with correction processing and stored in the EEPROM 32 in a table format as shown in FIG. 12.

In this case, the CPU 30 determines the displacement amount Ns=0, Ns=1, or Ns=2 in correspondence with the selection information of the three "resolutions", i.e., "fine", "normal", and "coarse".

If NO in step S201, the CPU 30 branches to processing in step S203.

In step S203, the CPU 30 determines the displacement amount Ns on the basis of the selection information of three "resolutions" i.e., "fine", "normal", and "coarse", as a scanning parameter read out from the RAM 31 with reference to data associated with correction processing and stored in the EEPROM 32 in a table format as shown in FIG. 12.

In this case, the CPU 30 determines the displacement amount Ns=4, Ns=3, or Ns=2 in correspondence with the selection information of the three "resolutions", i.e., "fine", "normal", and "coarse".

The flow advances to step S204. The CPU 30 shifts the image of the green component and the image signal of the red and blue components in the sub-scanning direction on the basis of the determined correction amount determined in step S202 or S203 in accordance with equation (1) and reads out the image data from the RAM 31, thereby performing image arithmetic processing for color misregistration correction.

Image arithmetic processing for color misregistration correction according to equation (1) above is represented as follows:

$$G(i,j) \leftarrow G(i,j),$$

$$B(i,j) \leftarrow B(i+Ns,j),$$

$$R(i,j) \leftarrow R(i+Ns,j)$$

Processing of determining the correction amount for color misregistration correction, i.e., steps S108, S201, S202, S203 in FIGS. 8A and 8B and color misregistration correction processing, i.e., steps S109 and S204 in FIGS. 8A and 8B are stored, in the memory medium (FD) 400 such as a floppy disk loaded in the PC 200, as a series of computer readable program coding means which include predetermined procedures necessary for correction processing, and are to be executed by the CPU 30 in the PC 200.

In the above-described first embodiment, image information in the sub-scanning direction obtained by the linear sensor is transferred to an information processing unit such as a PC having a software program for exclusively performing correction processing. A table which defines the control method for correction processing in correspondence with the color misregistration state for the resolution is held in the memory means in advance. When a correction operation is performed in accordance with the memory means, image information without any color misregistration or with a minimum color misregistration can be reproduced from read image information containing a large amount of color misregistration.

In this embodiment, a quick scanner operation convenient for practical use can be performed by enabling a bidirectional scanning operation, unlike the prior art allowing only a one-direction scanning operation.

In addition, a memory which is conventionally necessary for holding image information for color misregistration correction can be omitted. In this embodiment, therefore, a compact and inexpensive apparatus can be realized.

(Second Embodiment)

A scanner system according to the second embodiment of the present invention will be described below with reference to the accompanying drawings.

The same reference numerals as in the first embodiment denote the same parts in the second embodiment, and a detailed description thereof will be omitted.

The system configuration of this embodiment is basically the same as in the first embodiment.

In the second embodiment, a two-line linear sensor (to be simply referred to as a CCD 3 serving as a linear sensor hereinafter) as in the first embodiment is employed, which has no buffer for a memory for holding image information for color misregistration correction.

The opening width and inter-line interval of the structure of the CCD 3 serving as a linear sensor are basically the same as those shown in FIG. 4.

The film scanner main body has no buffer (e.g., for a memory for holding image information for color misregistration correction), as in the first embodiment.

The scanner system with this arrangement according to the second embodiment of the present invention is characterized by the method of correction processing associated with color misregistrations.

This correction processing will be described mainly with reference to FIGS. 10, 11, and 13.

Figure 10:
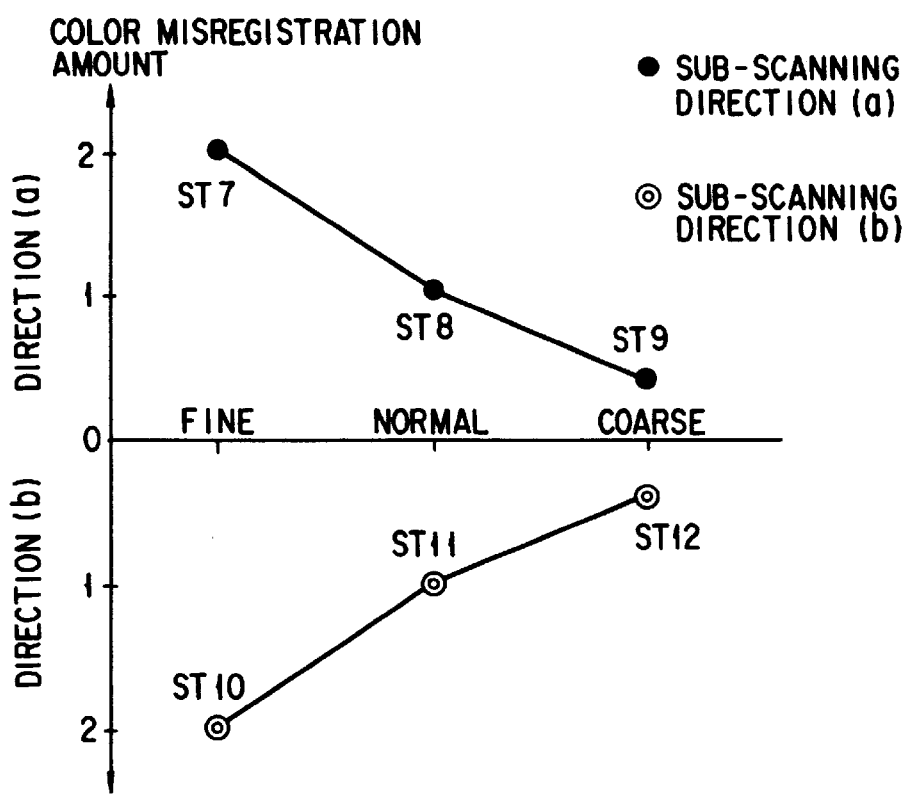
FIG. 10 is a graph for explaining differences in amounts of color misregistration generated in the read image depending on the sub-scanning direction or resolution before color misregistration correction processing in the scanner system of the second embodiment.

FIG. 10 is a graph showing the tendency of increases/decreases in amount of color misregistration contained in read image information before color misregistration correction processing of the scanner system according to the second embodiment.

More specifically, the graph in FIG. 10 shows differences in amount of color misregistration generated in read image information depending on the sub-scanning direction and resolution, i.e., "fine", "normal", or "coarse", of the CCD 3 serving as a linear sensor.

Different from the graph shown in FIG. 6, the graph in FIG. 10 indicates that a color misregistration in almost the same amount is generated for each of the two opposing sub-scanning directions (a) and (b) of the CCD 3 serving as a linear sensor.

To correct the image information read by the CCD 3 serving as a linear sensor, which contains a color misregistration in a similar amount regardless of the sub-scanning direction, correction processing must be performed under control considering the tendency shown in the graph of FIG. 10.

FIG. 13 is a table showing contents which is looked up in color misregistration correction processing.

More specifically, FIG. 13 is a table showing color misregistration states (ST) and corresponding displacement amounts (Ns), which is looked up for correction processing of the second embodiment and stored in an EEPROM 32, as in the first embodiment.

In a PC 200 serving as an information processing unit, "scanning parameter transfer" in step S106, "correction amount determination" in step S108, and "color misregistration correction" in step S109 of correction processing shown in FIG. 8A are performed as color misregistration correction processing in the following manner such that the above equation (1) holds.

Control corresponding to the displacement amount Ns, i.e., the correction amount, is performed in accordance with the table shown in FIG. 13.

For example, when the sub-scanning direction of the CCD 3 serving as a linear sensor is (a) (state ST7), the image is shifted in the direction (a) by a distance corresponding to −2 pixels.

This processing is equivalent to processing of shifting the image in the direction (b) by a distance corresponding to 2 pixels.

When the sub-scanning direction is (b) (state ST10), the image is shifted in the direction (a) by a distance corresponding to 2 pixels.

With the above correction processing, the color misregistration amount in image information read with the "fine" resolution converges to zero.

In a similar manner, the color misregistration amount in image information read with the "normal" or "coarse" resolution is reduced.

Figure 11:
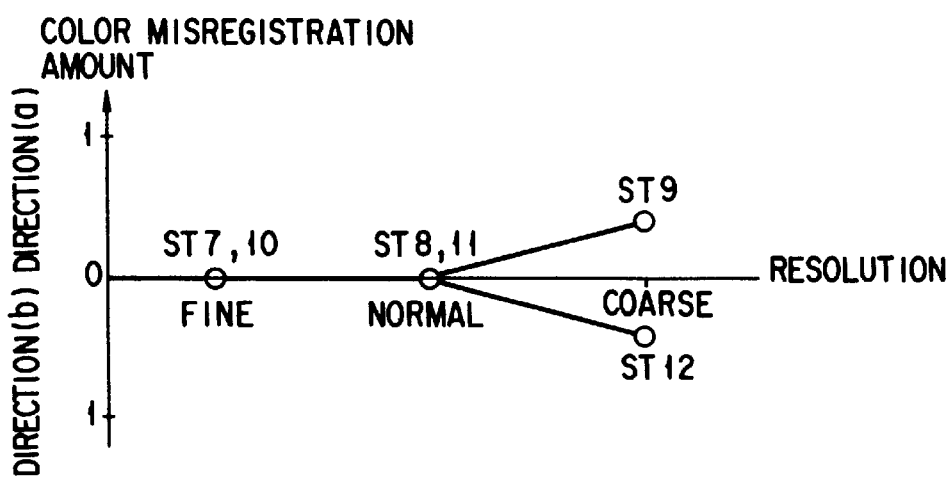
FIG. 11 is a graph for explaining differences in improved color misregistration amounts generated depending on the sub-scanning direction or resolution after color misregistration correction processing in the scanner system of the second embodiment.

FIG. 11 is a graph showing differences in color misregistration amount improved in the above manner.

More specifically, FIG. 11 is a graph showing the color misregistration amount after color misregistration correction processing of the scanner system according to the second embodiment for each of the sub-scanning directions and resolutions.

In the above-described second embodiment as well, image information in the sub-scanning direction obtained by the linear sensor is transferred to an information processing unit such as a PC having a software program for exclusively performing correction processing. A table which defines the control method for correction processing in correspondence with the color misregistration state for the resolution is held in the memory means in advance. When a correction operation is performed in accordance with the memory means, image information without any color misregistration or with a minimum color misregistration can be reproduced from read image information containing a large amount of color misregistration.

In the second embodiment as well, a quick scanner operation convenient for practical use can be performed by enabling a bidirectional sub-scanning operation, unlike the prior art allowing only a one-direction sub-scanning operation.

In addition, in the second embodiment as well, a memory which is conventionally necessary for holding image information for color misregistration correction can be omitted. In this embodiment, therefore, a compact and inexpensive apparatus can be realized.

(Modification)

In the embodiments of the present invention, a two-line linear sensor is used as an image sensing device. Instead, a sensor having a different line arrangement such as a three-line linear sensor may be used. The "color misregistration amount" changes accordingly because of the difference in structures, as a matter of course. Additionally, correction processing corresponding to FIG. 12 or 13 also changes. Tables according to correction processing corresponding to the respective linear sensors may be prepared and stored in the EEPROM.

The means for storing the table is not limited to the EEPROM. A magnetic memory means such as a hard disk or a floppy disk, or an optical memory means such as a CD-ROM or a magnetooptical disk may be used.

Furthermore, information written in the memory means in advance may be read out at the time of use, stored in the RAM, and independently used.

(Other Modifications)

In the above embodiments, a total of three read resolution modes, "fine", "normal", and "coarse", are defined. The resolution may be selected from a larger number of modes, as a matter of course.

In the above embodiments, the "resolution" and sub-scanning direction are used as parameters for determining the correction content of color misregistration correction processing. Other parameters associated with the color misregistration of an image, including the optical performance of the scanner, may also be used.

Needless to say, the present invention is not limited to the above-described first and second embodiments, and various changes and modifications can be made without departing from the spirit and scope of the invention.

A plurality of embodiments of the present invention have been described above. This specification also incorporates the following inventions.

(1) A scanner system comprising a scanner for sensing a color original image by a linear sensor constituted by a plurality of solid state image sensing device arrays, and an information processing unit for converting an image signal output from the scanner,
wherein the information processing unit includes correction means for correcting a color misregistration between image signals output from the plurality of solid state image sensing device arrays.

(2) A scanner system for reading a color original image, comprising
a scanner having a linear sensor constituted by a plurality of solid state image sensing device arrays to sense the color original image and output an image signal, and control means for outputting a predetermined sensing condition of the linear sensor, and
an information processing unit having color misregistration correction means for correcting, on the basis of an output from the control means, a color misregistration between image signals sensed by the plurality of solid state image sensing device arrays.

(3) A scanner system described in (2), wherein the scanner has resolution selection means for selectively switching a read resolution, and
the sensing condition output from the control means is a sub-scanning direction of the linear sensor, or a resolution set by the resolution selection means.

(4) A scanner system for reading a color original image, comprising
a scanner having a linear sensor constituted by a plurality of solid state image sensing device arrays to sense the color original image and output an image signal, and control means for outputting a sensing condition of the linear sensor, and
an information processing unit having color misregistration correction means for correcting, on the basis of an output from the control means, a color misregistration between image signals sensed by the plurality of solid state image sensing device arrays.

(5) A scanner system described in (4), wherein the condition output from the control means is a sub-scanning direction of the linear sensor.

(6) A scanner system described in (4), wherein the condition output from the control means is a resolution set by resolution selection means.

(7) A scanner system described in (4), wherein the condition output from the control means is a sub-scanning direction of the linear sensor and a resolution set by resolution selection means.

(8) A scanner system described in (4) to (6), wherein color misregistration correction is performed on the basis of the sub-scanning direction of the scanner or the selected resolution with reference to a table prepared in advance.

(9) A scanner system described in (4), (5), (7), or (8), wherein color misregistration correction is selectively performed on the basis of information of the sub-scanning direction output from the control means.

(10) A scanner system for reading a color original image, comprising
a scanner having a linear sensor constituted by a plurality of solid state image sensing device arrays to sense the color original image and output an image signal, and control means for outputting a sensing condition of the linear sensor, and
an information processing unit having memory means for temporarily storing the image signal output from the scanner, and color misregistration correction means for shifting a read position of the image signal sensed by the plurality of solid state image sensing device arrays, on the basis of the output from the control means, in reading out the image signal from the memory means.

(11) A scanner system described in (10), wherein the condition output from the control means is a sub-scanning direction of the linear sensor.

(12) A scanner system described in (10), wherein the condition output from the control means is a resolution set by resolution selection means.

(13) A scanner system described in (10), wherein the condition output from the control means is a sub-scanning direction of the linear sensor and a resolution set by resolution selection means.

(14) A scanner system described in (4) to (13), wherein the information processing unit is a personal computer.

(15) A scanner system comprising
a scanner having a linear sensor for sensing a color original, and
a personal computer having color misregistration correction means for correcting a color misregistration in an image signal read by the scanner.

(16) A scanner system described in (10), wherein processing contents of color misregistration correction processing performed by the personal computer are changed in accordance with a sub-scanning direction of the linear sensor.

(17) A scanner system described in (10), further comprising resolution selection means for selectively switching a read resolution, and wherein the control means externally outputs a signal representing a resolution set by the resolution selection means, the image signal converted by the linear sensor, and information associated with a scanning direction of the image sensing means driven by the sub-scanning means.

(18) A scanner system described in (17), wherein the control means comprises a RISC (Reduced Instruction Set Computer).

(19) A method of correcting a color misregistration in an image signal in a computer system which executes processing of the image signal from a scanner including a linear sensor for reading an original in accordance with a predetermined sub-scanning parameter, comprising the steps of:

receiving the image signal from the scanner and the predetermined sub-scanning parameter and storing the image signal and the sub-scanning parameter in a memory;

determining a displacement amount for correcting the color misregistration in the image signal in accordance with the predetermined sub-scanning parameter read out from the memory; and performing predetermined image arithmetic processing for the image signal read out from the memory in accordance with the determined displacement amount, thereby correcting the color misregistration.

(20) An article of manufacture comprising:

a computer readable memory medium having computer readable program coding means recorded to execute processing of an image signal from a scanner including a linear sensor for reading an original in accordance with a predetermined sub-scanning parameter, wherein the computer readable program coding means comprises first computer readable program means for causing a computer to receive the image signal from the scanner and the predetermined sub-scanning parameter and store the image signal and the sub-scanning parameter in a memory, second computer readable program means for causing the computer to determine a displacement amount for correcting a color misregistration in the image signal in accordance with the predetermined sub-scanning parameter read out from the memory; and third computer readable program means for causing the computer to perform predetermined image arithmetic processing for the image signal read out from the memory in accordance with the determined displacement amount, thereby correcting the color misregistration.

As has been described above, the scanner system of the present invention comprises a scanner for reading an image and an information processing unit for performing color misregistration correction. The scanner main body or linear sensor need not always have a buffer for color misregistration correction, so that the scanner main body can be made compact and lightweight.

The color misregistration amount in the read image changes depending on the resolution in reading the image. However, when the correction amount for color misregistration correction is changed in accordance with the resolution, an image with a minimum color misregistration can always be read.

In a scanner having a CCD with a buffer for color misregistration correction as well, the color misregistration amount which changes depending on the sub-scanning direction can be corrected in accordance with the sub-scanning direction. A bidirectional scanning operation is enabled, so the image sensing means need not be returned to the start position every time sub-scanning for one image is completed. Therefore, when images are to be continuously read, the scanning time can be shortened.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A scanner system for reading a color original image, comprising:

a scanner having only two linear sensors, the scanner including:
only two linear sensors, each linear sensor including a plurality of solid state image sensing devices arranged to sense the color original image with a bidirectional sub-scanning operation in two opposite directions, and to output an image signal,
control means for outputting a control signal for defining a respective predetermined sensing condition of each of said linear sensors, and
a resolution selection device which selectively switches a read resolution of said scanner; and
an information processing unit having color misregistration correction means for correcting, on the basis of the control signal output from said control means, a color misregistration between image signals sensed by said plurality of solid state image sensing devices of said two linear sensors;
wherein the control signal output from said control means comprises a signal containing information of a sub-scanning direction of each of said two linear sensors and a signal representing a resolution set by said resolution selection device; and
wherein said control means is made of a RISC (Reduced Instruction Set Computer).

2. A scanner system according to claim 1, wherein color misregistration correction by said color misregistration correction means is performed based on the sub-scanning direction of each of said linear sensors or a selected resolution with reference to a table prepared in advance.

3. A scanner system according to claim 1, wherein color misregistration correction by said color misregistration correction means is selectively performed based on information of the sub-scanning direction output from said control means.

4. A scanner system for reading a color original image, comprising:

a scanner having only two linear sensors, the scanner including:
only two linear sensors, each linear sensor including a plurality of solid state image sensing devices arranged to sense the color original image with a bidirectional sub-scanning operation in two opposite directions, and to output an image signal, control means for outputting a control signal for defining a respective sensing condition of each of said linear sensors, and a resolution selection device which selectively switches a read resolution of said scanner; and an information processing unit having:

a memory which temporarily stores image signals output from said scanner, and color misregistration correction means for shifting a read position of the image signal sensed by said solid state image sensing devices of said two linear sensors, based on the control signal output from said control means, in reading out the image signal from said memory;

wherein the control signal output from said control means comprises a signal containing information of a sub-scanning direction of each of said linear sensors and a signal representing a resolution set by said resolution selection device; and wherein said control means is made of a RISC (Reduced Instruction Set Computer).

5. A scanner system according to claim 4, wherein one of said two linear sensors comprises a line type CCD of green devices, and the other of said two linear sensors comprises a line type CCD of red and blue devices which are alternately arranged.

6. A scanner system comprising:

an image sensing unit having only two linear sensors, the image sensing unit including:

only two linear sensors, each linear sensor including a plurality of solid state image sensing devices arranged to convert a film image into an image signal, and a resolution selection device which selectively switches a read resolution of said image sensing unit;

sub-scanning means for driving said two linear sensors of said image sensing unit in two oppositely directed scanning directions which are perpendicular to a pixel arrangement direction of said two linear sensors; and control means for externally outputting the image signal converted by said two linear sensors and information associated with the scanning direction of said image sensing unit driven by said sub-scanning means;

wherein the control signal output from said control means comprises a signal containing information of a sub-scanning direction of said two linear sensors and a signal representing a resolution set by said resolution selection device; and wherein said control means is made of a RISC (Reduced Instruction Set Computer).

7. A scanner system according to claim 6, wherein said control means externally outputs a signal representing a resolution set by said resolution selection device, the image signal converted by said two linear sensors sensor, and the information associated with the scanning direction of said image sensing unit driven by said sub-scanning means.

8. A scanner system comprising:

a scanner having only two linear sensors for sensing a color original, one of said two linear sensors comprising a line type CCD of green devices and the other of said two linear sensors comprising a line type CCD of red and blue devices which are alternately arranged; and a personal computer having color misregistration correction means for correcting a color misregistration in an image signal read by said scanner, wherein processing contents of color misregistration correction processing performed by said personal computer are changed in accordance with information of a sub-scanning direction of said linear sensors; and wherein said personal computer is made of a RISC (Reduced Instruction Set Computer).

9. A color scanner system comprising:

an image sensing unit having only two line sensors, one of the line sensors comprising two line memory devices, and said only two line sensors being arranged and configured to convert an optical image into an electronic image signal;

operation controlling means for making the image sensing unit perform sub-scanning in two opposite directions perpendicular to a longitudinal direction of the two line sensors, the operation controlling means comprising (i) sub-scanning means for controlling a read timing of each of the two line memory devices, and (ii) a read resolution setting device which sets a read resolution of the image sensing unit at a plurality of values; and color misregistration correction means for correcting a color misregistration of the electronic image signal to a minimum in accordance with at least one of the read resolution of the image sensing unit set by said read resolution setting device and the directions of the sub-scanning.

10. A color scanner system according to claim 9, wherein said operation controlling means is made of a RISC (Reduced Instruction Set Computer).

11. A method of correcting a color misregistration in an image signal in a computer system which executes processing of the image signal from a scanner including only linear sensors for reading an original in accordance with a predetermined sub-scanning parameter, the method comprising the steps of:

receiving the image signal from said scanner by performing sub-scanning of said only linear sensors in two opposite directions perpendicular to a longitudinal direction of the line sensors, and receiving the predetermined sub-scanning parameter, and storing the image signal and the sub-scanning parameter in a memory;

determining a displacement amount for correcting the color misregistration in the image signal in accordance with the predetermined sub-scanning parameter read out from said memory; and performing predetermined image arithmetic processing for the image signal read out from said memory in accordance with the determined displacement amount, thereby correcting the color misregistration.

12. An article of manufacture comprising:

a computer readable memory medium having computer readable program coding means recorded to execute processing of an image signal from a scanner which includes only two linear sensors for reading an original in accordance with a predetermined sub-scanning parameter, wherein said computer readable program coding means comprises:

first computer readable program means for causing a computer to receive (i) an image signal from said scanner by performing sub-scanning of said only two linear sensors in two opposite directions perpendicular to a longitudinal direction of the line sensors and (ii) the predetermined sub-scanning parameter, and for causing a computer to store the image signal and the sub-scanning parameter in a memory;

second computer readable program means for causing said computer to determine a displacement amount for correcting a color misregistration in the image signal in accordance with the predetermined sub-scanning parameter read out from said memory; and third computer readable program means for causing said computer to perform predetermined image arithmetic processing for the image signal read out from said memory in accordance with the determined displacement amount, thereby correcting the color misregistration.

* * * * *